(12) United States Patent
Asbridge et al.

(10) Patent No.: US 7,844,444 B1
(45) Date of Patent: Nov. 30, 2010

(54) FIBRE CHANNEL DISK EMULATOR SYSTEM AND METHOD

(75) Inventors: Vincent B. Asbridge, Worcester, MA (US); Steven R. Munroe, Westford, MA (US)

(73) Assignee: Sanblaze Technology, Inc., Maynard, MA (US)

( * ) Notice: Subject to any disclaimer, the term of this patent is extended or adjusted under 35 U.S.C. 154(b) by 397 days.

(21) Appl. No.: 10/995,856

(22) Filed: Nov. 23, 2004

(51) Int. Cl.
*G06F 9/455* (2006.01)
*G06F 11/00* (2006.01)

(52) U.S. Cl. ............... 703/23; 703/24; 714/25; 714/29

(58) Field of Classification Search ............. 703/23–24; 711/6, 202; 714/3, 43, 29, 25
See application file for complete search history.

(56) References Cited

U.S. PATENT DOCUMENTS

| | | | |
|---|---|---|---|
| 5,388,060 A | 2/1995 | Adams | |
| 5,606,681 A * | 2/1997 | Smith et al. | 711/203 |
| 5,838,593 A * | 11/1998 | Komatsu et al. | 703/15 |
| 5,974,547 A | 10/1999 | Klimenko | |
| 6,304,965 B1 | 10/2001 | Rickey | |
| 6,446,141 B1 * | 9/2002 | Nolan et al. | 710/8 |
| 6,539,341 B1 * | 3/2003 | Li et al. | 702/187 |
| 6,631,456 B2 | 10/2003 | Leighnor et al. | |
| 6,640,278 B1 * | 10/2003 | Nolan et al. | 711/6 |
| 6,728,848 B2 * | 4/2004 | Tamura et al. | 711/162 |
| 6,738,937 B1 | 5/2004 | Bergsten | |
| 6,766,466 B1 | 7/2004 | Jibbe | |
| 7,020,600 B2 | 3/2006 | Deao | |
| 7,032,136 B1 * | 4/2006 | Gajjar et al. | 714/43 |
| 7,055,014 B1 * | 5/2006 | Pawlowski et al. | 711/202 |
| 7,069,307 B1 * | 6/2006 | Lee et al. | 709/217 |
| 7,110,928 B1 * | 9/2006 | Lee | 703/13 |
| 7,114,106 B2 * | 9/2006 | Klotz et al. | 714/712 |
| 7,124,324 B1 * | 10/2006 | Au | 714/29 |
| 7,127,633 B1 * | 10/2006 | Olson et al. | 714/4 |
| 7,181,439 B1 * | 2/2007 | Lent et al. | 707/2 |
| 7,203,730 B1 * | 4/2007 | Meyer et al. | 709/213 |
| 7,246,105 B2 * | 7/2007 | Numanoi et al. | 707/1 |
| 2003/0014208 A1 * | 1/2003 | Glynn et al. | 702/120 |
| 2003/0179777 A1 | 9/2003 | Denton | |
| 2003/0191623 A1 * | 10/2003 | Salmonsen | 703/24 |
| 2003/0200290 A1 | 10/2003 | Zimmerman et al. | |
| 2003/0208675 A1 | 11/2003 | Burokas et al. | |
| 2004/0030668 A1 * | 2/2004 | Pawlowski et al. | 707/1 |
| 2004/0193397 A1 | 9/2004 | Lumb | |

(Continued)

OTHER PUBLICATIONS

"Minerva: An Automated Resource Provisioning Tool for Large-Scale Storage Systems", Alvarez et al, ACM transactions on Computer Systems, vol. 19, No. 4, pp. 483-518, Nov. 2001.*

(Continued)

*Primary Examiner*—David Silver
(74) *Attorney, Agent, or Firm*—Clock Tower Law Group; Erik J. Heels; Michael A. Bartley

(57) ABSTRACT

A system and method for emulating disk drives in a storage area network, including providing a system with one or more ports for connecting to a storage area network, emulating one or more targets for each port of the system, and emulating one or more LUNs for each emulated target of the system.

18 Claims, 5 Drawing Sheets

U.S. PATENT DOCUMENTS

| | | |
|---|---|---|
| 2004/0267516 A1* | 12/2004 | Jibbe et al. .................... 703/24 |
| 2004/0268200 A1 | 12/2004 | Mak |
| 2005/0015460 A1* | 1/2005 | Gole et al. ................. 709/213 |
| 2005/0027892 A1* | 2/2005 | McCabe et al. ............ 709/253 |
| 2005/0044244 A1* | 2/2005 | Warwick et al. ........... 709/229 |
| 2005/0228835 A1* | 10/2005 | Roa .......................... 707/204 |
| 2006/0010233 A1 | 1/2006 | Fellenstein |
| 2006/0106819 A1* | 5/2006 | Dhanadevan et al. ....... 707/100 |

OTHER PUBLICATIONS

"Proceeding of the FAST 2002 Conference on File and Storages Technologies", USENIX Association, Jan. 2002.*

"Proceeding of the 5th Annual Linux Showcase & Conference on File and Storages Technologies", USENIX Association, Nov. 2001.*

"Innovative Target and Initato Emulation Solutions", Product Description, SANBlaze Technology Inc., 2006.*

SANBLAZE, "SanBlaze Technologies Storage and Networking Solutions"—"SANBlaze System Products", http://web.archive.org/web/20031203093222/sanblaze.com/Systems.html, Dec. 3, 2003.*

IBM, "Language for Architecture Validation of Fibre Channel Standard ", IBM Technical Disclosure Bulletin, Jun. 1997, US, vol. 40, Issue 6, Pub Jun. 1, 1997, cross reference 0018-8689-40-6-155.*

Molero, X.; Silla, F.; Santonja, V.; Duato, J., "A tool for the design and evaluation of fibre channel storage area networks," Simulation Symposium, 2001. Proceedings. 34th Annual , vol., no., pp. 133-140, 2001.*

Agilent Technologies, "Agilent Technologies' storage area network tester software provides breakthrough in test scalability through device virturalization", Press Release, Oct. 15, 2003, Agilent Technologies, Inc., Palo Alto, CA.

D. Johnson. "Bus emulation drives production testing", Test & Measurement World, vol. 15, No. 2 , pp. 41-48 , Feb. 1995, Cahners Publishing, USA.

I-Tech, "IPC-6160 SCSI tester", I-TECH Corp., Eden Prairie, MN, Pages from www.i-tech.com, printed on Nov. 23, 2004.

Ancot, "FCAccess 2000G Traffic Generator", Ancot Corp., Menlo Park, CA, Pages from www.ancot.com, printed on Nov. 23, 2004.

Finisar, "PacketMaker", Finisar Corp., Sunnyvale, CA, Pages from www.data-transit.com, printed on Nov. 23, 2004.

DataCore, "SANmelody", DataCore Software Corp., Ft. Lauderdale, FL, Pages from www.datacore.com, printed on Nov. 23, 2004.

* cited by examiner

FIBRE CHANNEL DISK EMULATOR SYSTEM AND METHOD

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2004 SANBlaze Technology, Inc.

CROSS REFERENCE TO RELATED APPLICATIONS

None.

BACKGROUND OF THE INVENTION

1. Field of the Invention

The invention relates to target emulation technologies. More specifically, the invention relates to Fibre Channel hard disk emulation. Even more specifically, the invention relates to testing Fibre Channel devices that are capable of addressing multiple disk drives.

"SCSI" (Small Computer System Interface) is an industry standard for connecting peripheral devices and their controllers to an initiator (en.wikipedia.org/wiki/SCSI). A SCSI device is usually a peripheral (for example, a hard disk drive) that responds to an operation requested by a SCSI "initiator," which is usually the host system. SCSI peripherals are "targets," but for some commands, the SCSI peripheral may need to act temporarily as an initiator.

"Fibre Channel" is another industry standard (en.wikipedia.org/wiki/Fibre_channel). Logically, the "Fibre Channel" is a bidirectional, full-duplex, point-to-point, serial data channel structured for high performance data communication. Physically, the Fibre Channel is an interconnection of multiple communication ports interconnected by 1) a switching network (a "fabric"), 2) a point-to-point link, or 3) an arbitrated loop. Fibre Channel is a generalized transport mechanism that has no protocol of its own or native input/output command set but can transport any existing Upper Level Protocols ("ULPs)" such as Asynchronous Transfer Mode ("ATM"), Internet Protocol ("IP"), and SCSI. Commonly, Fibre Channel refers to a serial computer bus intended for connecting high speed SCSI storage devices to computers in a Storage Area Network ("SAN").

A Logical Unit Number ("LUN") is a SCSI identifier within a target assigned to each Fibre Channel accessible disk that allows the host system to address and access data on the target devices. One physical SCSI hard disk drive can be subdivided into multiple LUNs.

2. Description of Prior Art

The most common way to test Fibre Channel devices that address multiple disk drives is to create a test environment that contains multiple physical disk drives. For example, if a lab needed to test a Fibre Channel device that claimed to be able to address a varying amount of disk drives, each with different parameters, the lab's test engineers would need to physically assemble a large number of disk drives or "scratch disks" for use in testing. Furthermore, to determine how the device would react to adverse conditions such as bad drives, labs would maintain some set of faulty disk drives to enable this level of testing to occur. Such an environment is expensive and time-consuming to set up.

There have been some attempts to solve the problem of providing an environment for testing disk drives.

There are Fibre Channel bus analyzer products on the market that allow for single drive emulation, but these usually require a great amount of programming (in, for example, the C++ programming language). If properly programmed and configured, analyzer and/or traffic generator products such as I-TECH's IPC-6160 (www.i-tech.com/pdfs/IPC-6160.pdf), Ancot's FCAccess 2000G (www.ancot.com/fcproducts/2000G/2000g.html), and Finisar's (formerly Data Transit) PacketMaster (www.data-transit.com/products/pdfs/is_pm_svt.pdf) can emulate a drive.

The SANmelody product by DataCore (www.datacore.com/) serves virtual hard disks to popular operating systems using connection protocols such as standard iSCSI over Ethernet and Fibre Channel, and it supports allocation requests from Windows Virtual Disk Service (VDS). The problem with this product is that it is a software product designed to run on only the Microsoft Windows operating system. Since it is a server product, a Windows server is required, and system administrator time is required to set up and run the software. Also, this product is intended for the permanent storage of data, not the test environment, and therefore does not allow for the emulation of error cases, rapid creation and removal of devices, or the emulation of a set of devices that exceed the real storage capability of the host system.

U.S. Pat. No. 6,631,456 "Hypercache RAM based disk emulation and method" (Leighnor et al. Oct. 2, 2003) discloses a RAM-based memory emulation device directed at solving the problem of reducing access times for swap and paging files. The Leighnor patent, however, involves improving the performance of a personal computer by using some of the computer's RAM as a temporary hard disk and does not relate to Fibre Channel devices or Fibre Channel device testing.

There are several problems with the approaches of the prior art.

One problem is time and money. Setting aside a large amount of Fibre Channel disk drives for testing and development purposes can cost a significant amount of money. Configuring these resources into different configurations to allow for testing of multiple scenarios takes lab time and effort. Physically connecting and changing drive configurations can quickly take considerable time and resources of lab personnel.

Another problem is the lack of reliable error and fault testing. With physical disks, it is difficult to find and keep an inventory of "bad" drives with predictable behavior and then configuring them into test systems. Yet it is important for device vendors to be able to test their devices against disks with known bad conditions. The ability to inject specific types of disk errors into a test environment is missing in the prior art.

Another problem is the lack of controllable environment variables. For example, to test a device, a tester may want to test 40 disk drives, then 20 minutes later have 10 of the disks fail or go away, then 5 minutes later add the disks back into the test. This example could represent a situation where power is lost to the 10 drives and later restored. With the prior art, testers lack the ability to create, change, and test scenarios such as this.

None of the above provides a suitable environment for efficiently testing Fibre

Channel devices. What is needed for the software, hardware, and infrastructure test market, therefore, is 1) a system that provides virtual disk drives for testing without the need for specialized software or extensive programming;

2) a user interface to the system that provides simple and instantaneous creation and deletion of test LUNs one at a time or in groups; and 3) the ability to simply and instantaneously modify any of the parameters associated with a storage drive across one device or in groups.

BRIEF SUMMARY OF THE INVENTION

The invention provides a Fibre Channel disk emulation system that can be used for Fibre Channel device testing. The system emulates Fibre Channel disk drives for read/write performance testing environments and requires no initiator-side software changes. For testers, the system reduces the need to deploy large amounts of expensive physical "scratch" disks by providing high performance, non-volatile, virtual disk media. With six Fibre Channel ports running at 2 Gbps, the system can be configured to present from 1 to 480 virtual disks per channel, up to 2880 virtual LUNs. The software includes predefined tests for performance, stability, MaxLUN, exception, and read/write/fault insertion allowing a Fibre Channel device to be tested as if the device were attached to a large array of physical disks. A web-based graphical user interface ("GUI") allows a tester to configure, reconfigure, inject errors, and monitor from a remote client computer.

Example Uses

The following two examples illustrate some of the ways that the invention solves the problems of the prior art.

Example Use: New Product Development Testing iSCSI to Fibre Channel Bridge

For example, if a developer needs a scalable and affordable environment for testing a new iSCSI to Fibre Channel bridge device ("test device") and desires to connect the test device to many different SAN/Fibre Channel configurations, then the invention can provide a system with virtual disks that can be used in place of multiple physical disk drives or arrays. Error conditions and different LUN counts can be simulated at wire speed to allow the tester to pinpoint problems with the test device and to provide a repeatable environment to test against.

With the invention, the developer can realize several benefits. The cost of setting up a test environment is a fraction of the cost of the physical disk systems needed to test real world environments. The test environment can be easily and quickly scaled to simulate a large number of scenarios and error conditions. Developers can quickly understand when, where, and why the test device began to experience problems. As a result, products can be debugged and launched to market sooner.

Example Use: Infrastructure Testing and Troubleshooting Streaming Video System

For example, if a streaming video editing system developer needs to troubleshoot two issues—the first, sporadic frame loss and jitter; the second, video dying after multiple hours of testing—then the invention can provide a system to replace physical disk arrays to allow developers to quickly simulate varying drive system characteristics.

With the invention, the developer can realize several benefits. A large number of disks can be emulated easily, thereby allowing for large systems testing at full speed without expensive physical infrastructure. The test environment can be quickly scaled to simulate a large number of scenarios and error conditions at full speed. As a result, the time needed to reconfigure test arrays is significantly less than would have been needed to build/configure and integrate multiple physical disk configurations, and the system's ability to run full speed testing decreases the mean time between errors from hours to minutes, which, in turn, significantly decreases troubleshooting time. As a result, products can be debugged and launched to market sooner.

Features and Advantages

Large Scale Target Emulation

A feature of the invention is large scale target emulation. The invention provides and all-in-one computer system for emulating thousands of disk drives. The advantage of this is that a test environment can be set up quickly with no need for installing or configuring software. Also, predefined tests (including performance, stability, MaxLUN, exception, and read/write/fault insertion) further reduce the time needed for setting up a test environment.

Rapid Configuration and Reconfiguration

Another feature of the invention is rapid configuration and reconfiguration. A web-based user interface allows for rapid configuration and reconfiguration of test environments, and the changes can be presented onto the SAN in real time. Since the user interface is web-based, it can be accessed remotely over a network from a client computer equipped with a web browser. Error conditions can be inserted by a users via the web-based user interface or can be programmed to be inserted based upon an event or occurrence.

Additionally, a scripting language allows testing to occur in a predetermined fashion based on events and/or triggers, thereby allowing the user to program and save various test scenarios, run the tests scenarios automatically, and repeat as needed without the need for user or physical intervention. A Command-Line Interface ("CLI") is also provided for the scripting language. The CLI can be accessed locally or remotely via a network.

Target and LUN Attributes Configuration

Another feature of the invention is the ability to configure attributes of targets and LUNs. The number, size, and features of each emulated disk drive can be configured. LUN attributes that can be configured include, but are not limited to:

1) Variable disk size.

2) Variable write size.

3) Ability to appear as a "perfect" disk, indistinguishable to the initiator from a standard disk.

4) Ability to respond to any operation in error, either once, or multiple times.

5) Ability to change device identification information so as to emulate a specific device (e.g. a "Quantum disk drive") or a generic device.

6) Ability to appear as "removable."

7) Ability to appear as "write protected."

8) Ability to vary "latency" or read or write I/Os.

9) Dual port emulation (i.e. the same LUN can be presented on two (A and B) ports).

10) Automated fail-over and path redundancy testing using dual port feature.

Other Features

Other features include:

1) Support for multiple ports.

2) Emulation of several physical Fibre Channel devices (world wide node name/world wide port names) per port.

3) Ability to inject "errors" on ports, by manual intervention or script, including, but not limited to, Loop initialization (LIP), Loop reset, Link disable (turn off light), Set link speed (or automatic), and Set link topology (or automatic).

4) Ability to monitor error counters and present results via a graphical user interface (GUI) or script.

5) Ability to emulate multiple storage protocols (including, but not limited to, Fibre Channel, SAS, SATA, iSCSI, and SCSI).

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION OF THE INVENTION, INCLUDING THE PREFERRED EMBODIMENT

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Operation

Figure 1:
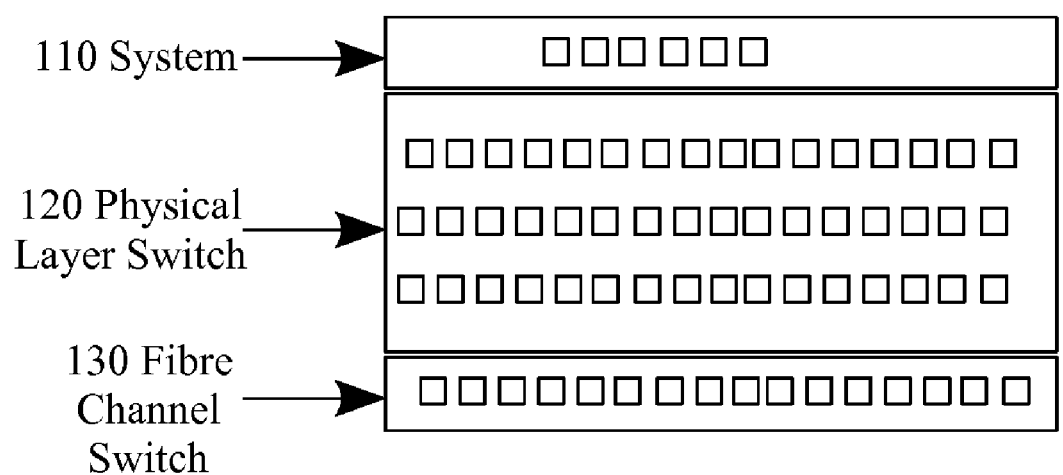
FIG. 1 is a schematic of the system in a SAN environment.

In the preferred embodiment, the invention is implemented as a combination of hardware and software as a one-unit (1 U) rack-mounted computer system ("computer system" or "system"). FIG. 1 is a schematic of the system in a SAN environment. The system 110 is designed to be installed in a SAN environment close to a network patch panel or physical layer switch 120 so that it can be connected to an existing SAN (not shown) via a Fibre Channel switch 130. The ports in FIG. 1 are exemplary and do not represent the actual system ports. Actual ports include Fibre Channel ports, Ethernet RJ-45 ports (for FTP, telnet, and HTTP access), and DB-9 serial connector (for terminal access).

Figure 2:
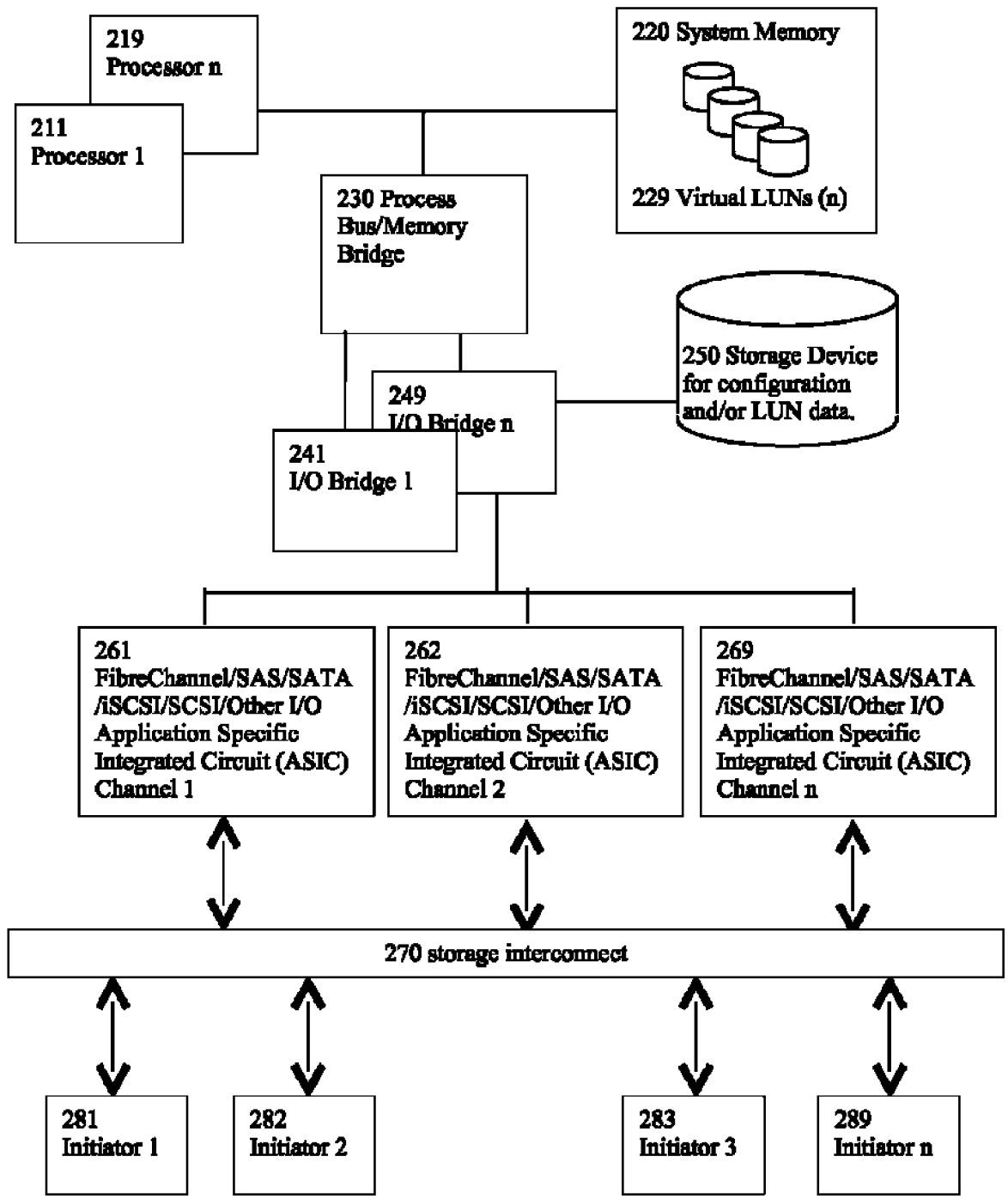
FIG. 2 is a high-level diagram of the system.

FIG. 2 is a high-level diagram of the system. In the system 110, multiple processors (processor 1 211 and processor n 219 are shown) connect to system memory 220, which are RAM storage devices. LUNs are created in system memory 220 (RAM) as virtual LUNs 229. Since RAM has faster access times than disk-based media, virtual LUNs provide the maximum possible performance with the lowest possible latency. LUNs can be used as "scratch disks" for testing or for other applications that require a rapidly accessible copy of data (including, but not limited to, video files, database, trade show demonstrations).

Continuing with FIG. 2. Multiple I/O controllers (I/O controller 261 for channel 1, I/O controller 262 for channel 2, and I/O controller 269 for channel n are shown) store and retrieve data to and from virtual LUNs 229 via DMA (Direct Memory Access; i.e. without subjecting processors 211-219 to an interrupt load) by way of multiple I/O bridges (I/O bridge 1 241 and I/O bridge n 249 are shown) and process bus/memory bridge 230, thereby providing the maximum possible bandwidth while allowing for real writes and reads to support data integrity testing. I/O controllers 261-269 operate independently of each other such that activity on one will not adversely affect activity on another. I/O controllers 261-269 are modular and interchangeable allowing support for multiple storage protocols (including, but not limited to, Fibre Channel, SAS, SATA, iSCSI, and SCSI) without changing the system hardware and software.

Continuing with FIG. 2. Multiple external initiators (initiator 1 281, initiator 2 282, initiator 3 283, and initiator n 289 are shown) connect via storage interconnect 270 to I/O controllers 261-269, thereby setting up external initiators 281-289 for testing by the system. In the preferred embodiment, storage interconnect 270 is Fibre Channel but can be one of multiple physical bus architectures (including, but not limited to, Fibre Channel, SAS, SATA, iSCSI, and SCSI). Virtual LUNs 229 appear as physical disk drives to initiators 281-289, and have identical characteristics over multiple physical bus architectures (including, but not limited to, Fibre Channel, SAS, SATA, iSCSI, and SCSI).

Continuing with FIG. 2. The multiple I/O bridges 241-249 interconnect with storage device 250. During operation of the system, LUN data is stored and retrieved to and from virtual LUNs 229 in system memory 220 (RAM). LUN data can also be saved to permanent storage in storage device 250 (e.g. as a database on a physical hard disk drive) such that test configurations can be re-created when needed. In addition to LUN data, storage device 250 also stores configuration data, including:

1) system configuration data;

2) port configuration data;

3) target configuration data;

4) LUN configuration data, the number and attributes of the virtual LUNs in each configuration; and 5) program configuration data, the tests created with the scripting language to run on each configuration.

The system saves configuration data to storage device 250 upon system shutdown so that the configuration data can be restored on re-start.

Figure 3A:
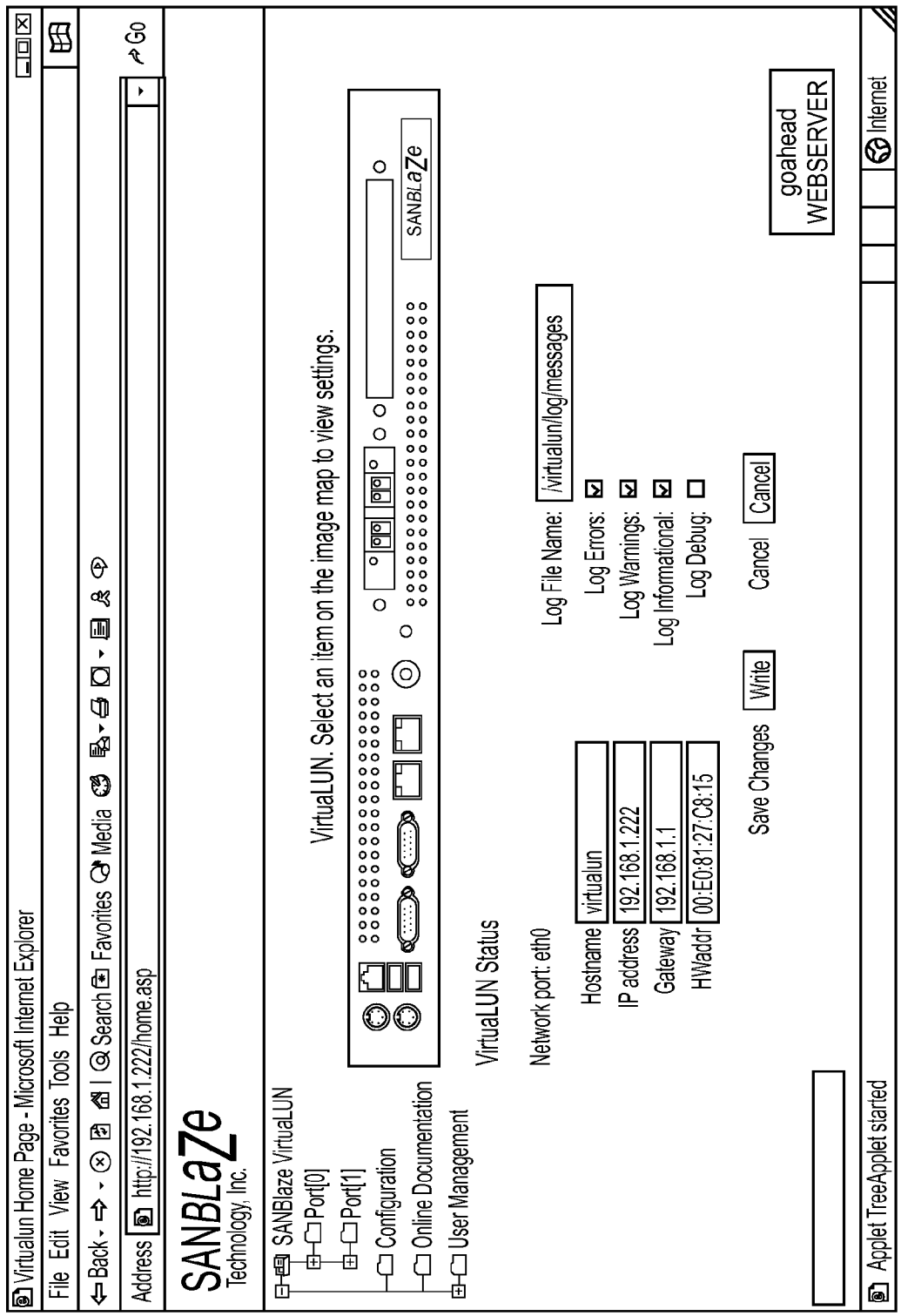
FIG. 3A is a screen-shot of the home page of the system's graphical user interface as viewed from a web browser.

FIG. 3A is a screen-shot of the home page of the system's graphical user interface as viewed from a web browser. From the home page, a user can change system configuration data including hostname, IP address, gateway, hardware (MAC) address, log file pathname/filename, and log error reporting level (errors, warning, informational, and/or debug). The system can also be shutdown or restarted via the home page.

Figure 3B:
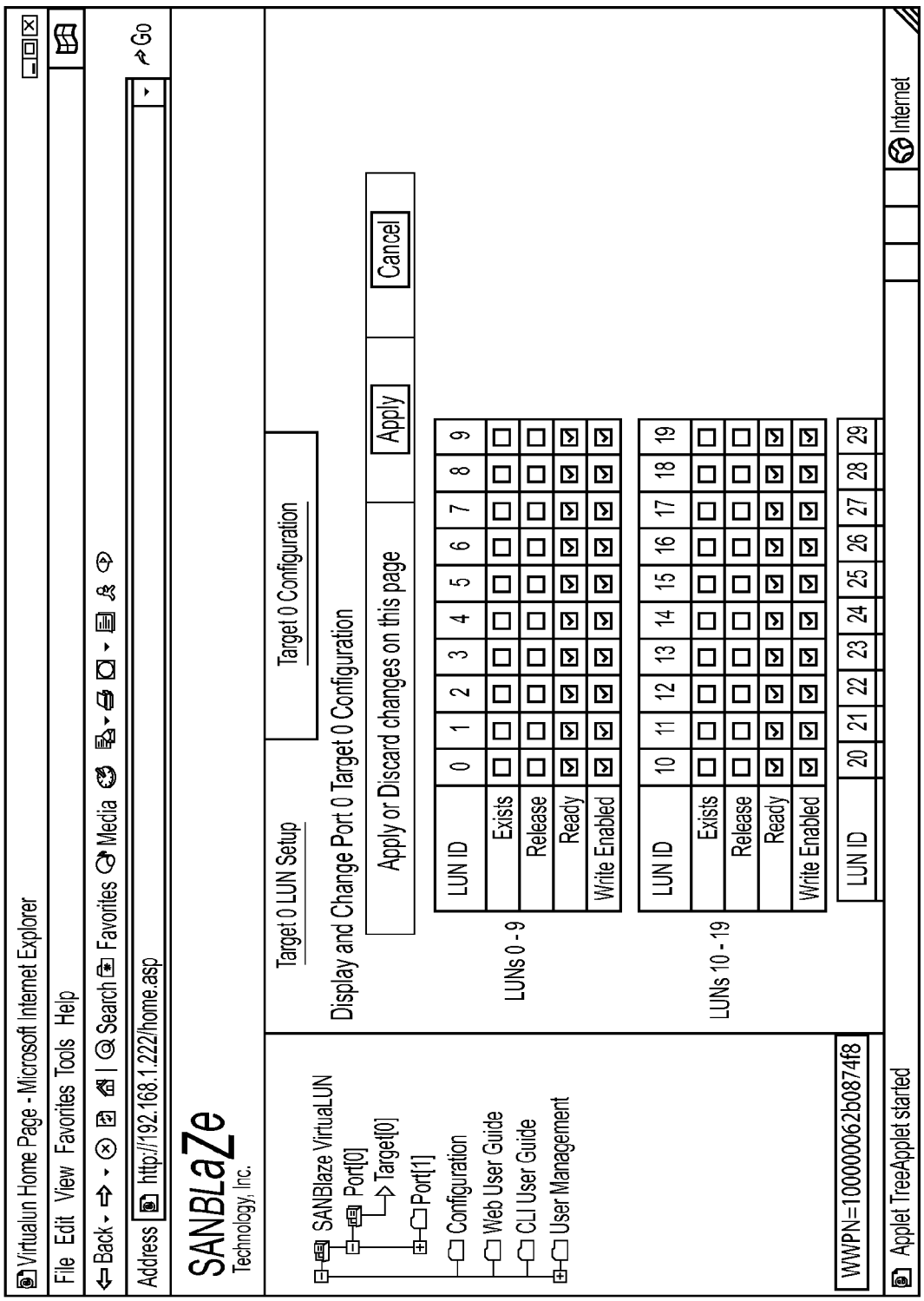
FIG. 3B is a screen shot of the target page of the system's graphical user interface as viewed from a web browser.

A menuing system provides access to other aspects of the system. The system is designed to have up to 6 ports, up to 16 targets per port, and up to 30 LUNs per target, for a total of 2880 LUNs per system. FIG. 3B is a screen shot of the target page of the system's graphical user interface as viewed from a web browser. From the target page, a user can change target configuration data, including binary values for each of the 30 LUNs in the target for 1) "LUN exists" status, 2) "release" status, 3) "ready" status, and 4) "write enabled" status.

Figure 3C:
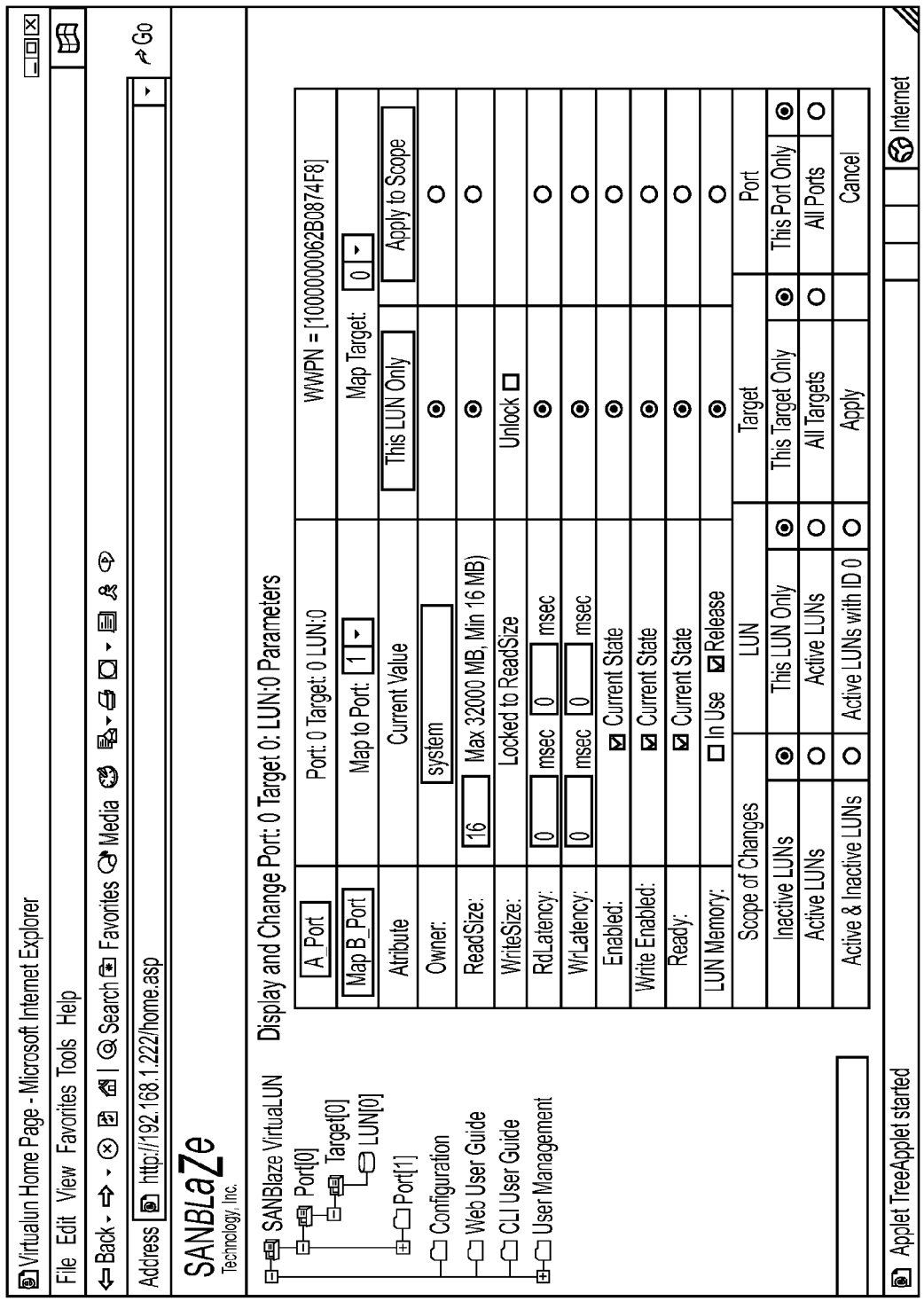
FIG. 3C is a screen shot of the LUN page of the system's graphical user interface as viewed from a web browser.

FIG. 3C is a screen shot of the LUN page of the system's graphical user interface as viewed from a web browser. From the LUN page, a user can change LUN configuration data, i.e. the LUN attributes.

1) The "enabled" attribute is a binary value that indicates whether a LUN is enabled.

2) The "write enabled" attribute is a binary value that indicates whether a LUN can be written to, and if this attribute is not enabled for the LUN, then the LUN will respond to a write request from an initiator with a "write protect" status message.

3) The "ready" attribute is a binary value that indicates whether a LUN is ready, and if this attribute is not enabled for the LUN, then the LUN will respond to a "Test Unit Ready" command with a "Not Ready" status message.

Continuing with FIG. 3C. Another LUN attribute is multi-port mapping. The system allows two ports to be "mapped" such that LUNs over the two ports appear as the "A" port and "B" port of a single dual-ported LUN. This feature is specifically designed for use in fail-over testing in multi-path environments. To map an A-port/B-port disk, a user would first turn on the "enabled" attribute for a LUN and then, from the LUN page, select the "Map B_Port" button. Mapped LUNs share a physical memory structure such that changes made to the configuration of either port will be reflected in both ports. Likewise, "writes" to port A are available as "reads" on port B and vice versa. Once multi-port mapping is set up, a user can conduct fail-over testing via the command line interface (CLI).

Continuing with FIG. 3C. Other LUN attributes are the "read size" and the "write size." A physical 16 MB hard disk drive has a read size of 16 MB and a write size of 16 MB. Virtual LUNs can vary the read size and write size for each emulated hard disk drive. Since virtual LUNs are created in system memory (RAM), the combination of the read sizes of all of the virtual LUNs cannot exceed the physical system memory on the system. From the LUN page, a user can set the read size for a LUN from a minimum value of 16 MB, and a user can set the maximum value to 32,000 MB (32 GB) or the total amount of system memory, whichever is greater. If a user attempts to set the maximum value to an amount greater than the total system memory, the system returns an error message.

The "write size" operates in two modes: "locked to read size" or "variable write size" (or "unlock"). In "locked to read size" mode, the write size is the same as the read size, and all write requests sent the LUN are honored. The LUN will act in the same manner as a physical hard disk drive, with memory allocated for the entire size of the drive. Since virtual LUNs are created in system memory (RAM), the number of drives available for emulation is equal to the total system memory divided by the read size. In "variable write size" mode, the system allows for the LUN to have different read and write sizes. In this mode, a drive can be configured to be larger than the available system memory (RAM). This feature can be used to simulate very large drive farms in a test scenario where the data is not important. In this mode, the write size could be used to format the drives, for example. Reads within the write size area would return good data. Writes that are done beyond the configured area are discarded, and reads to that area return a status message indicating that the drive is in "variable write size" mode. If a drive is written beyond the configured write size (i.e. writes are being discarded), the system notifies the user (for example, by turning the drive icon red) so that the user can identify when they should not expect a data compare test to be successful.

Continuing with FIG. 3C, other LUN attributes are the "read latency" and the "write latency." The read latency is a number (indicated in milliseconds) that represents when the LUN will respond. The read latency can be set to a fixed number or a variable number within a range. To set read latency to a fixed latency, a user sets both "minimum read latency" and "maximum read latency" to the same desired latency. To set read latency to a variable latency, a user sets a "minimum read latency" and a larger "maximum read latency." Setting the minimum value greater than the maximum value results in an error. The variable latency that is introduced is a pseudo random number that is generated between the two values. This is useful in simulating the variable latency that one would experience with a physical hard disk drive. The "write latency" attribute works in the same manner as the "read latency" attribute.

LUN attributes can be set individually, at the LUN level, at the target level, or at the port level. At the LUN level, a user can apply a LUN's attributes to the LUN only, to all inactive LUNs, to all active LUNs, to all active and inactive LUNs, to all LUNs with the same ID as the current LUN, or to all LUNs. At the target level, a user can apply a LUN's attributes to the current target or to all targets. At the port level, a user can apply a LUN's attributes to the current port or to all ports.

Once a user has determined how many LUNs and targets to configure, and has chosen values for system configuration data, port configuration data, target configuration data, and LUN configuration data; program configuration data can be created in the form of scripts written in the system's scripting language and executable via the system's command line interface (CLI) or using a remote scripting language such as Expect (expect.nist.gov/). For example, to test a device, a user may want to test 40 disk drives, then 20 minutes later have 10 of the disks fail or go away, then 5 minutes later add the disks back into the test. This example could represent a situation where power is lost to the 10 drives and later restored. With the CLI-based scripting language, a user can create, change, and test scenarios such as this.

An extensible scripting interface is provided, commands can be executed locally on the system from the command line or remotely via network connection or "in-band" over the storage interconnect. Example commands, actions, and errors conditions include, but are not limited to, the examples shown below. To influence the behavior of a LUN, a user can echo keywords to the LUN control node.

| Commands | Notes |
| --- | --- |
| ReadSize=m | m = size in megabytes |
| WriteSize=m | m = size in megabytes |
| Owner=<string> | <string> = owner name |
| WriteProtect=d | d = flag (0 or 1), 0 = disable, 1 = enable |
| Exists=d | d = flag (0 or 1), 0 = disable, 1 = enable |
| Free=d | d = flag (0 or 1), 0 = disable, 1 = enable |
| Removable=d | d = flag (0 or 1), 0 = disable, 1 = enable |
| Locked=d | d = flag (0 or 1), 0 = disable, 1 = enable |
| NotReady=d | d = flag (0 or 1), 0 = disable, 1 = enable |

For example, to take a drive away (i.e. unplug it), the following command can be entered at the command line prompt (indicated by "#") or written in a script:

```
# echo Exists=0 > /port0/alias0lun0
```

| Actions and Error Conditions | Notes |
|---|---|
| Busy=d,c | d = number, c = I/O count |
| Drop=d,c | d = number, c = I/O count |
| QueueFull=d,c | d = number, c = I/O count |
| CheckCond=d,x,x,x,c | d = number, x = key, x = ASC, x = ASCQ, c = I/O count (d and x are hex values) |
| ReadUnder=d,c | d = number, c = I/O count |
| ReadOver=d,c | d = number, c = I/O count |
| WriteUnder=d,c | d = number, c = I/O count |
| WriteOver=d,c | d = number, c = I/O count |
| ReadDelay=x,y | x = min, y = max (if only x then set min and max to x) (x and y are in milliseconds) |
| WriteDelay=x,y | x = min, y = max (if only x then set min and max to x) (x and y are in milliseconds) |

To create a one-time busy event, the following command can be entered:

```
# echo Busy=1,0 > /port0/alias0lun0
```

To "busy" the next 5 commands, the following command can be entered:

```
# echo Busy=5,0 >/port0/alias0lun0
```

In the preferred embodiment, 1) the computing system is a one-unit (1 U) rack-mounted computer system;

2) the CPUs are Intel microprocessors;

3) the operating system is the Mandrake 2.4 version of Linux;

4) the web server is the GoAhead (www.goahead.com) embedded HTTP server;

5) the menuing system of the graphical user interface (GUI), is implemented in Sun's Java programming language for execution by client computers as a Java applet in the Java Virtual Machine (JVM) environment;

6) the emulation engine software is written in the C programming language.

Other Embodiments

It is to be understood that the above description is intended to be illustrative, and not restrictive. Many other embodiments will be apparent to those of skill in the art upon reviewing the above description. For example, 1) the computer system may be implemented on one single physical computer, multiple computers, virtual computers, distributed computers, or any combination thereof and additional ports may be included;

2) the CPUs can be any microprocessor capable of controlling a general purpose computer;

3) the operating system can be Windows, Mac OS, Linux, UNIX, or any other operating system;

4) the web server can be any server capable of being a server for HTTP and other TCP/IP protocols (SHTTP, FTP, SCP, telnet, SSH).

5) the software (including the menuing system of the GUI and the emulation engine) may be written in one of several widely available programming languages, and the modules may be coded as subroutines, subsystems, or objects depending on the language chosen.

The scope of the invention should, therefore, be determined with reference to the appended claims, along with the full scope of equivalents to which such claims are entitled.

In another embodiment, emulation is provided for tape storage media.

In another embodiment, emulation is provided for optical storage media.

In another embodiment, emulation is provided for environmental (e.g. temperature, humidity) monitors (SES).

In another embodiment, pass-through emulation is provided, whereby the system passes data from an emulated disk drive to a physical storage device.

In other embodiments, compatibility is provided for other protocols, including Serial Attached SCSI (SAS), iSCSI, SATA, 4 Gbps Fibre Channel, and 10 Gbps Fibre Channel.

The invention claimed is:

1. A computerized method for troubleshooting a fibre channel device, wherein said fibre channel device is designed for use in a storage area network, said method comprising:
   providing a system which does not function as a storage server, the system having one or more ports for connecting to a storage area network;
   emulating one or more targets for each port of said system wherein the emulated targets' total capacity exceeds a real total storage capacity of said system;
   emulating one or more LUNs for each emulated target of said system, wherein attributes of emulated LUNs are user configurable at a LUN level, at a target level, at a port level, and at a system level; and
   troubleshooting performance of the fibre channel device deployed in an application development environment using said emulated targets and said emulated LUNs, said fibre channel device capable of addressing one or more disk drives.

2. A computer device for troubleshooting a fibre channel device, wherein said fibre channel device is designed for use in a storage area network, said computer device comprising:
   a rack-mounted unit;
   one or more fibre channel ports on said unit for connecting to a storage area network;
   a memory component for storing emulated target disk drives; and
   a processor component programmed to:
      create multiple target disk drives in said memory component;
      emulate said target disk drives as part of said storage area network, wherein emulated target disk drives are configured with a total capacity exceeding a real total storage capacity of the memory available for said emulated target disk drives; and
      troubleshoot performance of the fibre channel device deployed in an application development environment using said emulated target disk drives and emulated LUNs, said fibre channel device capable of addressing one or more disk drives;
   wherein the computer device does not function as a storage server.

3. A target emulation system for troubleshooting a fibre channel device, wherein said fibre channel device is designed for use in a storage area network, said target emulation system comprising:
   a processor component programmed for:
      creating virtual disk drives in a random access memory component;
      providing a user interface for rapid configuration and reconfiguration of said virtual disk drives, thereby providing for rapid introduction of changes to a storage area network connected to said virtual disk drives;

emulating attributes of physical disk drives on said virtual disk drives, wherein the total capacity of the virtual disk drives as indicated by the emulated attributes exceeds a real total storage capacity of the available memory in the random access memory component; and troubleshooting performance of the fibre channel device deployed in an application development environment using said virtual disk drives, said fibre channel device capable of addressing one or more disk drives;

a random access memory component for maintaining said virtual disk drives; and at least one access port for providing a connection between said storage area network and said virtual disk drives;

wherein the target emulation system does not function as a storage server.

4. The method of claim 1 further comprising injecting one or more error conditions into said one or more ports of said system to test a response of said fiber channel device to said error conditions.

5. The method of claim 1 further comprising emulating multiple storage protocols.

6. The method of claim 1 further comprising providing pre-defined performance tests of said fibre channel device.

7. The device of claim 2, wherein said processor component is further programmed to insert multiple types of disk errors.

8. The device of claim 2, wherein said processor is controllable through a command line interface.

9. The device of claim 2, wherein said processor component is further programmed to simulate a variable read and write latency for emulated target disk drives.

10. The system of claim 3 wherein emulating attributes of physical disk drives includes emulating error cases.

11. The system of claim 3 wherein said user interface includes configuration for scheduling disk failures.

12. The system of claim 3 wherein said user interface includes configuration for errors to be inserted based upon designated events.

13. The system of claim 3 wherein parameters of each individual virtual disk drive are configurable.

14. The system of claim 3 wherein said processor is further programmed to pass data from an emulated disk drive to a physical storage device.

15. The system of claim 3 wherein testing is programmable using a scripting language.

16. A target emulation device for troubleshooting a fibre channel device, wherein said fibre channel device is designed for use in a storage area network, said target emulation device comprising:

a storage interconnect for receiving external initiators;

an I/O controller connected to said storage interconnect;

an I/O bridge connected to said I/O controller;

a storage device connected to said I/O bridge for storing configuration and virtual LUN data;

a process bus connected to said I/O bridge;

a memory component connected to said process bus; and a processor connected to said process bus and to said memory component, said processor programmed to:

configure and emulate a plurality of targets and a plurality of LUNs within each emulated target, wherein the emulated targets' total capacity exceeds a real total storage capacity of the available memory of the memory component; and troubleshoot performance of the fibre channel device deployed in an application development environment using said emulated plurality of targets and said emulated plurality of LUNs, said fibre channel device capable of addressing one or more disk drives;

wherein the target emulation device does not function as a storage server.

17. The device of claim 16, further comprising multiple I/O controllers wherein said I/O controllers operate independently from each other.

18. The device of claim 16, wherein said I/O controllers are modular and interchangeable.

* * * * *